Figure 1:
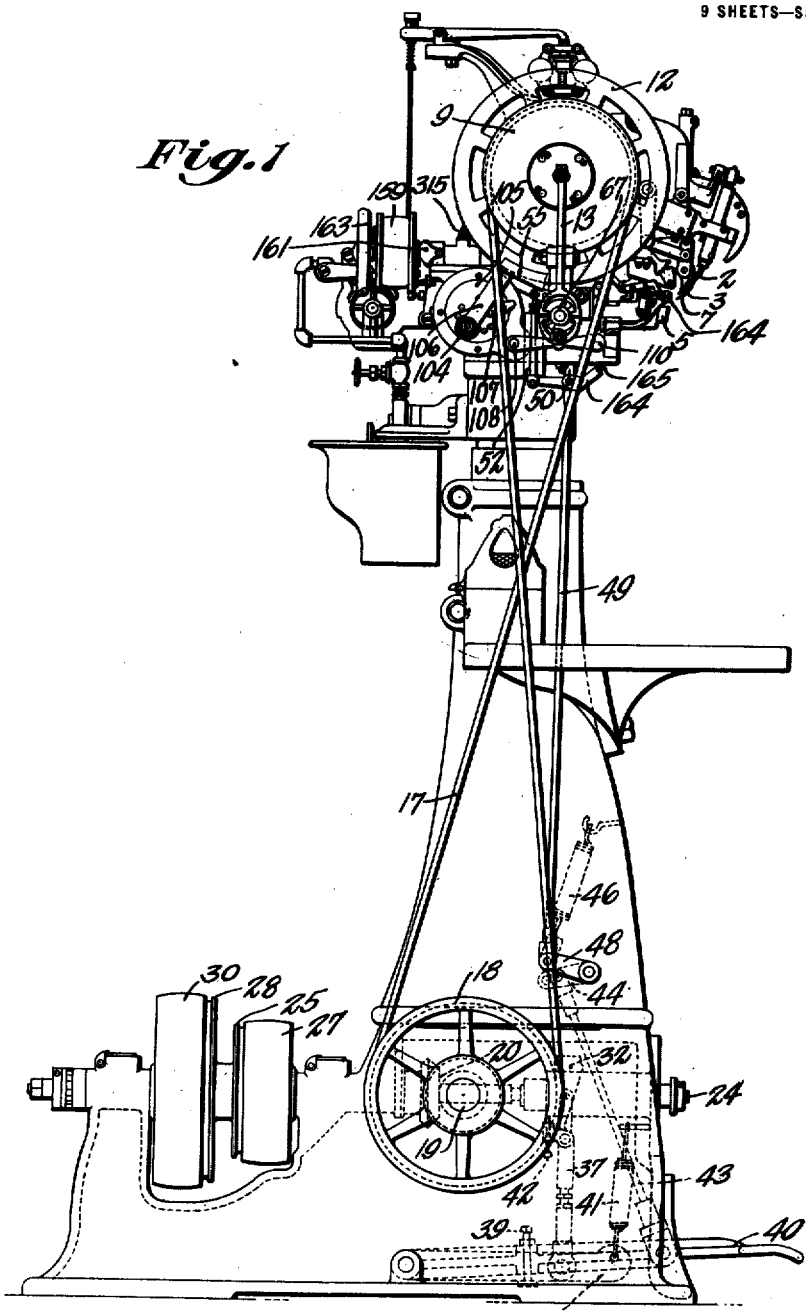

A. LATHAM.
STOP MECHANISM.
APPLICATION FILED JULY 25, 1918.

1,316,370.

Patented Sept. 16, 1919.
9 SHEETS—SHEET 1.

Witness
J. L. O'Neil

Inventor
Albert Latham
by Van Everen Fish & Hildreth
attys

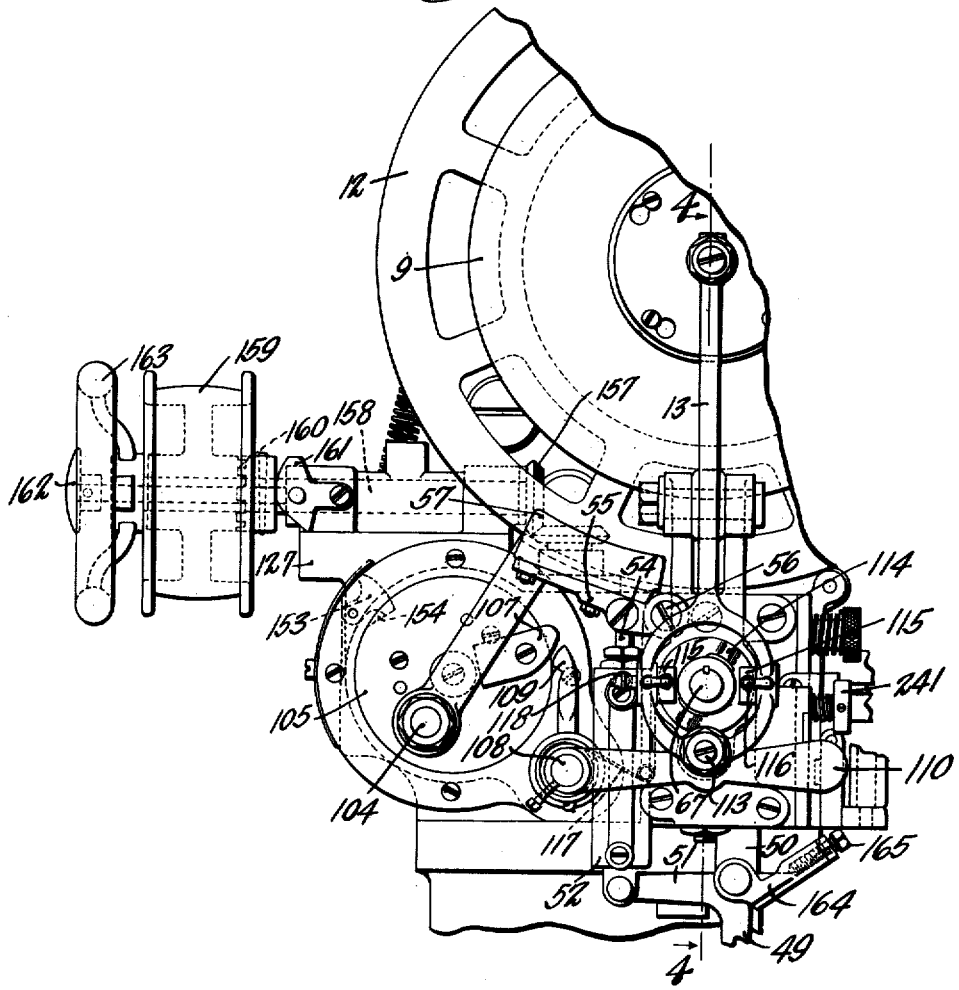

A. LATHAM.
STOP MECHANISM.
APPLICATION FILED JULY 25, 1918.
1,316,370.
Patented Sept. 16, 1919.
9 SHEETS—SHEET 3.
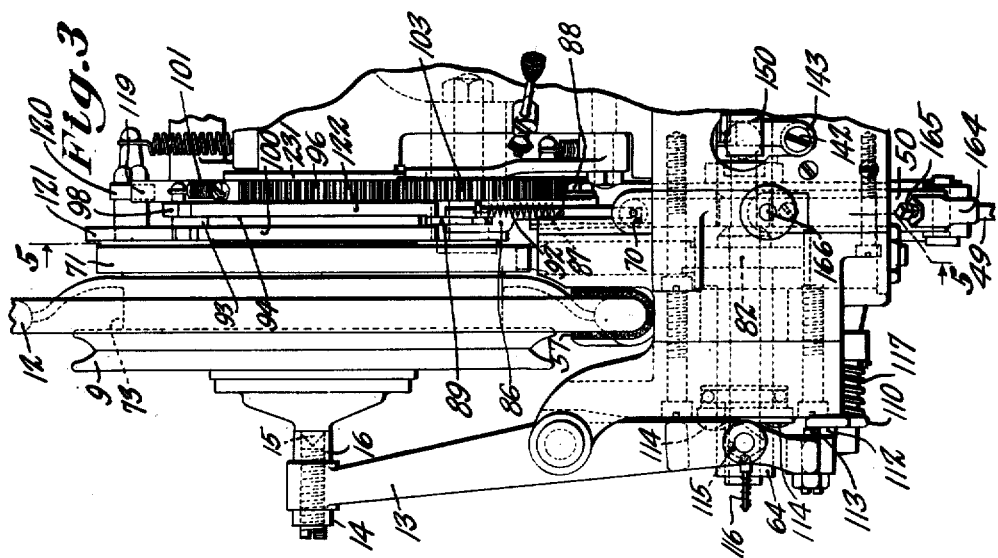
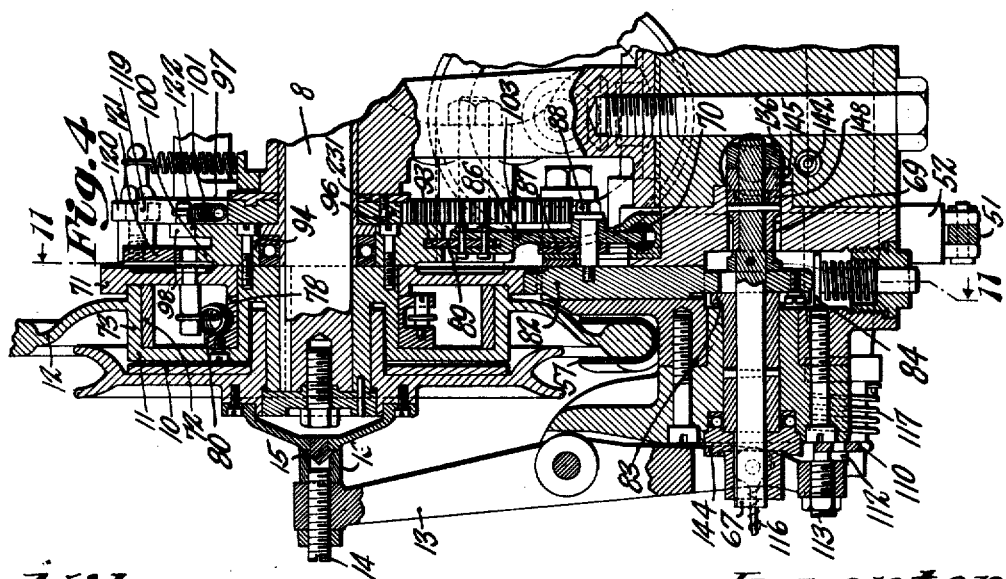
Witness
J. L. O'Neil
Inventor
Albert Latham
by Van Everen Fish & Hildreth
attys

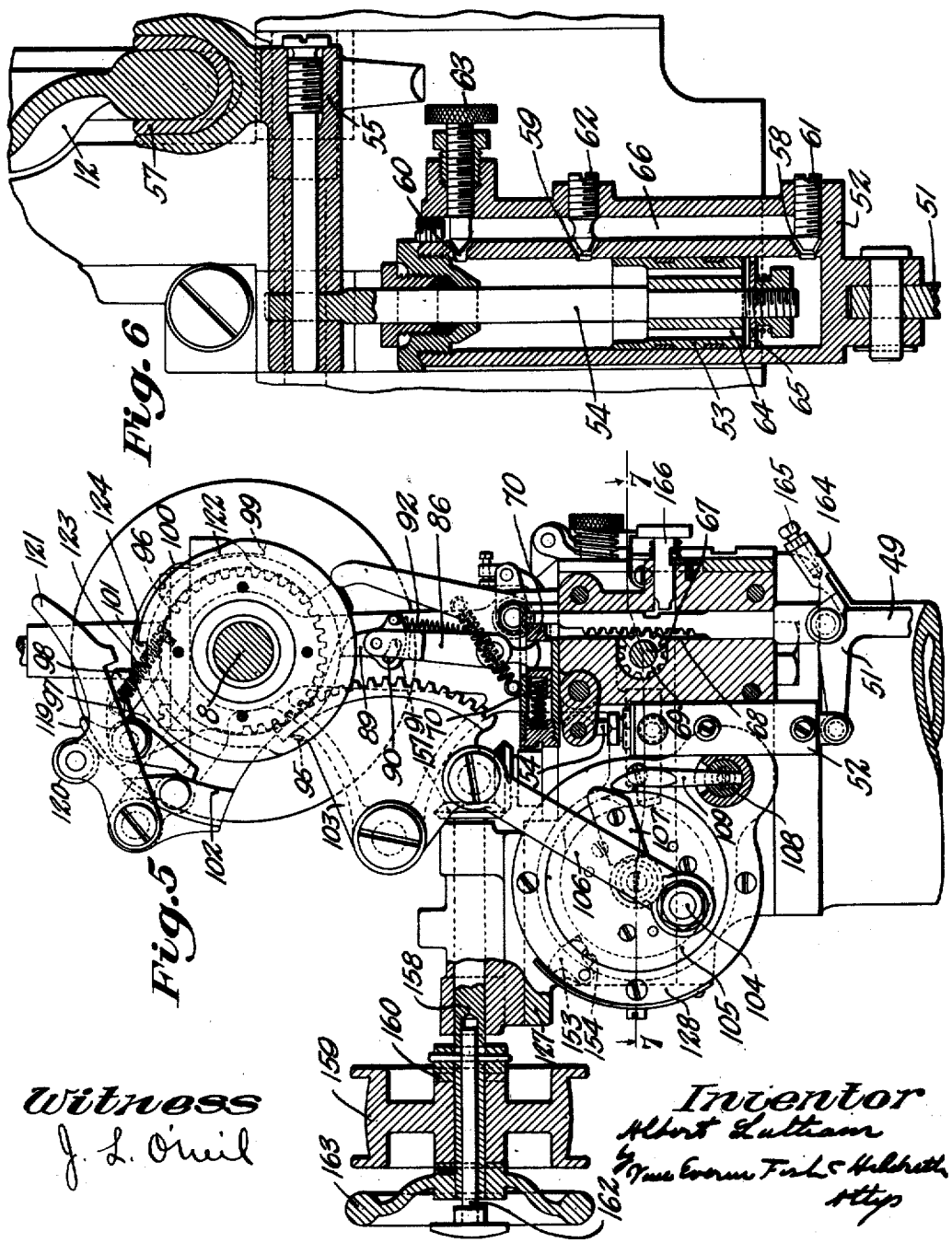

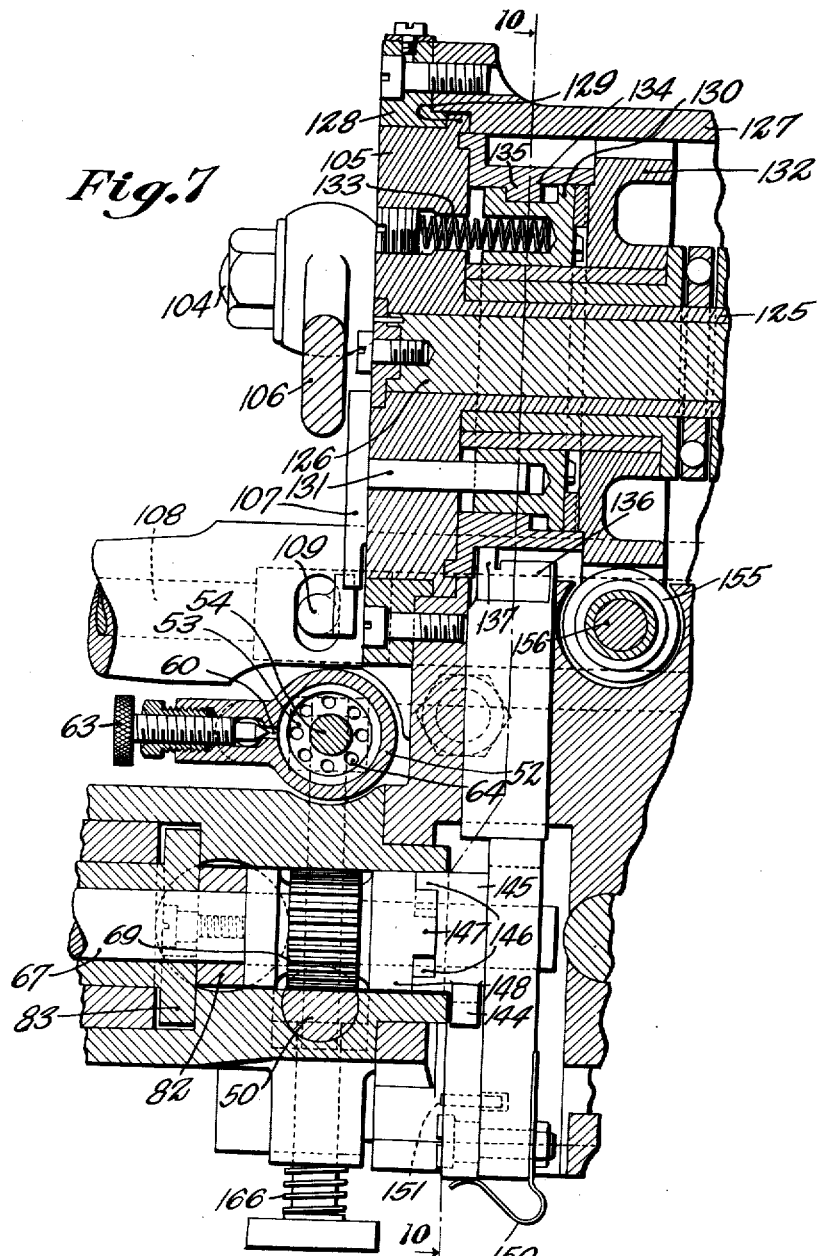

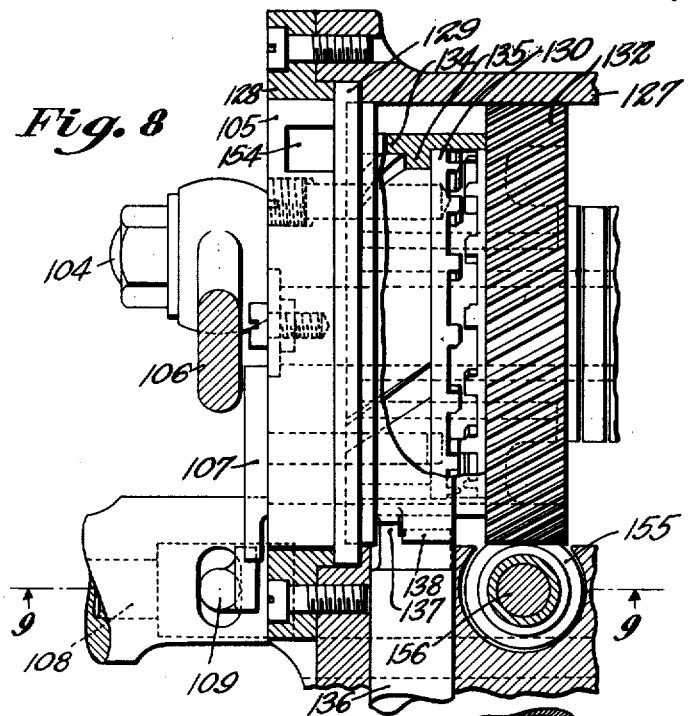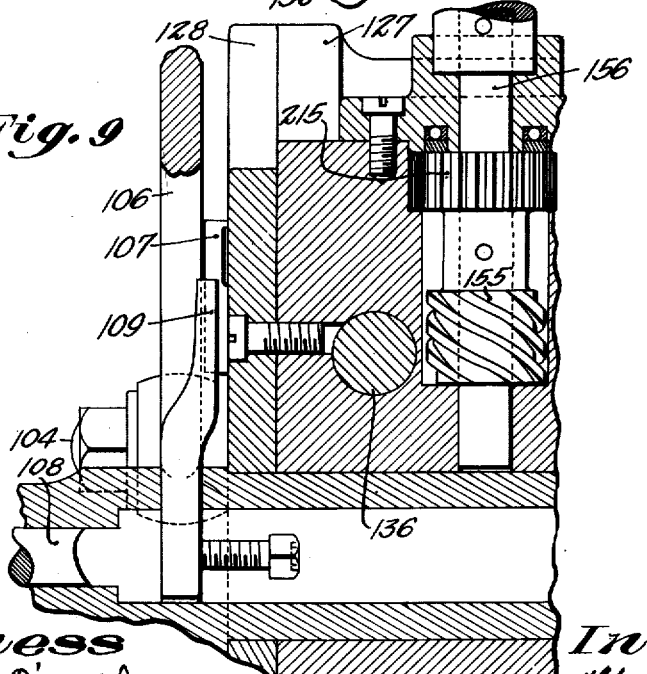

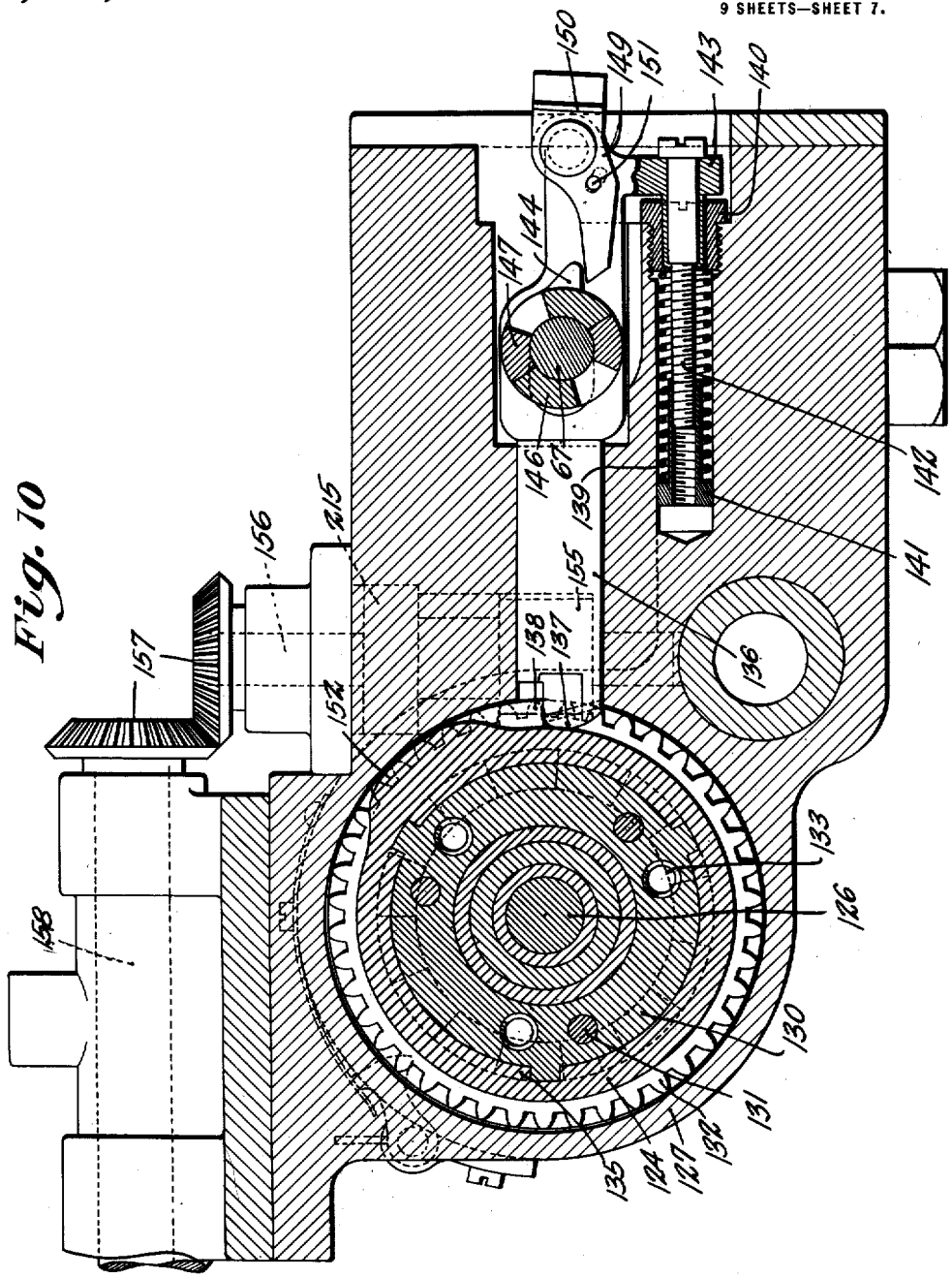

A. LATHAM.
STOP MECHANISM.
APPLICATION FILED JULY 25, 1918.
1,316,370.
Patented Sept. 16, 1919.
9 SHEETS—SHEET 8.
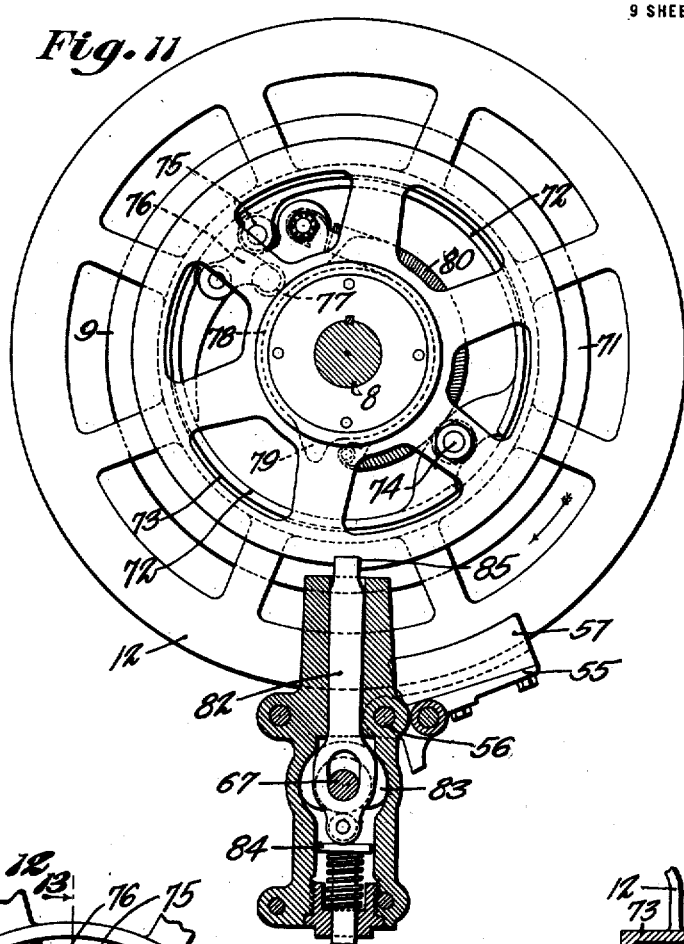
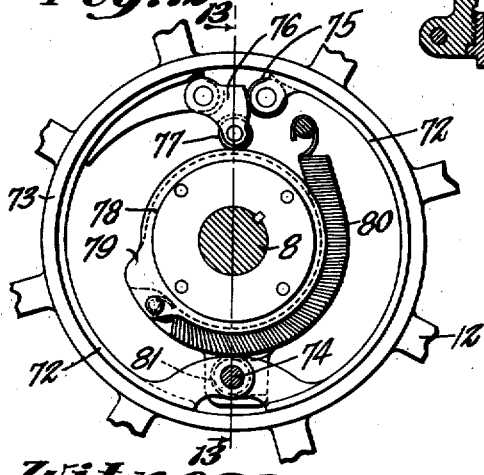
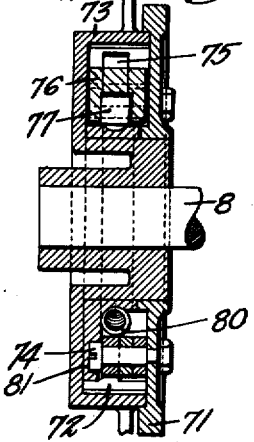

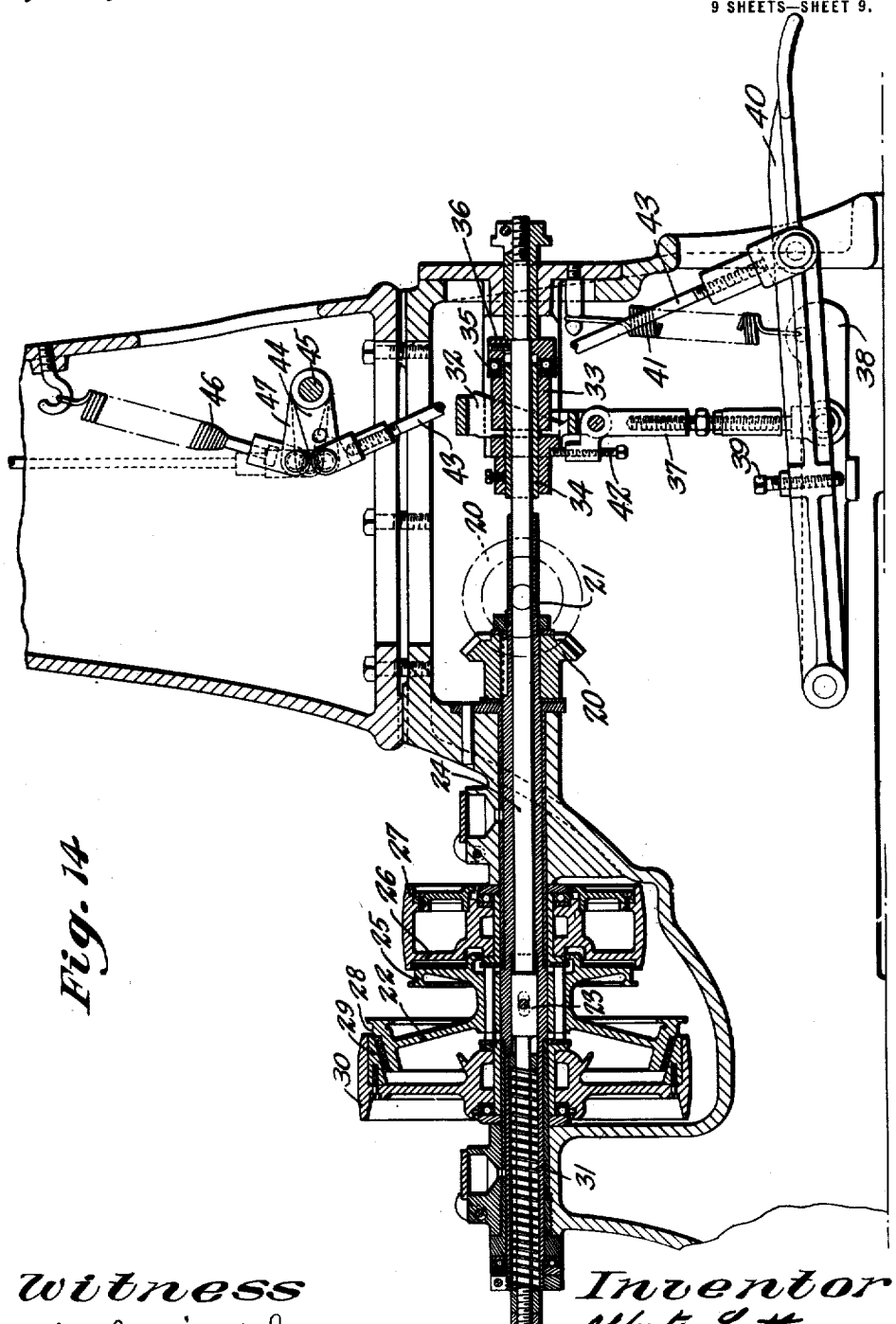

UNITED STATES PATENT OFFICE.

ALBERT LATHAM, OF BEVERLY, MASSACHUSETTS, ASSIGNOR TO UNITED SHOE MACHINERY CORPORATION, OF PATERSON, NEW JERSEY, A CORPORATION OF NEW JERSEY.

STOP MECHANISM.

1,316,370.      Specification of Letters Patent.      Patented Sept. 16, 1919.

Original application filed December 26, 1912, Serial No. 738,674. Renewed September 26, 1917, Serial No. 193,389. Divided and this application filed July 25, 1918. Serial No. 246,684.

*To all whom it may concern:*

Be it known that I, ALBERT LATHAM, a citizen of the United States, residing at Beverly, in the county of Essex and Commonwealth of Massachusetts, have invented certain new and useful Improvements in Stop Mechanism; and I do hereby declare the following to be a full, clear, and exact description of the invention, such as will enable others skilled in the art to which it appertains to make and use the same.

The invention relates to stop mechanisms for stopping a shaft or machine at a definite point in its movement.

In certain machines, for instance in inseam sewing machines, it is desirable in stopping the machine to first arrest the forward movement of the driving or cam shaft, and then reverse the shaft to bring it and the parts of the machine to final stopping positions. The invention is particularly applicable to such machines, although many of its features are not limited to stop mechanisms which act to reverse the shaft or machine before finally bringing it to rest, but may be embodied in mechanisms adapted to bring a shaft or machine to rest without reversing it.

The present application is a division of application Serial No. 193,389, filed September 26, 1917, renewal of application Serial No. 738,674, filed December 26, 1912, and in which the preferred form of the invention is shown applied to an inseam sewing machine for reversing the machine to free the thread from the needle, and for bringing the machine to rest with the needle and other parts in position for the removal of the shoe.

The various features of the invention will be readily understood from an inspection of the accompanying drawings and the following description of the mechanism illustrated therein.

In the drawings, Figure 1 is a side elevation showing an inseam sewing machine embodying the preferred form of the invention; Fig. 2 is a similar view showing some of the parts at the end of the cam shaft on a larger scale; Fig. 3 is a front elevation of parts at the end of the cam shaft; Fig. 4 is a vertical sectional view on line 4—4, Fig. 2; Fig. 5 is a vertical sectional view on line 5—5, Fig. 3; Fig. 6 is a vertical sectional view through the brake applying cylinder and piston; Fig. 7 is a horizontal sectional view on line 7—7, Fig. 5; Fig. 8 is a detail plan view, partly in section, showing the clutch for operating the mechanism which reverses the cam shaft; Fig. 9 is a vertical section on line 9—9, Fig. 8; Fig. 10 is a vertical sectional view on line 10—10, Fig. 7; Fig. 11 is a sectional view on line 11—11, Fig. 4; Fig. 12 is a detail elevation of the stopping mechanism shown in Fig. 11, the brake carrying disk being removed to show the parts behind it; Fig. 13 is a sectional view on line 13—13, Fig. 12; and Fig. 14 is a vertical sectional view through the axis of the driving clutches which are mounted in the base of the machine.

The invention is shown as embodied in a welt sewing machine having the construction and mode of operation of the machine illustrated and described in the application of Andrew Eppler, Serial No. 447,542, filed August 8, 1908, on which Patent No. 1,108,560 was granted August 25, 1914, except so far as the construction of the machine has been modified in applying the invention thereto.

The machine is driven through a treadle controlled clutch arranged in the base of the machine, and is provided with mechanisms which upon the release of the treadle reduce the speed and effect a preliminary stopping of the cam shaft and then turn it (in a reverse direction in the machine shown) at a low speed to final stopping position.

In the construction shown, when the controlling lever is released the main driving clutch is thrown out, a slow speed driving clutch is thrown in, and a brake is applied to the hand wheel on the end of the cam shaft of the machine, and is immediately released. The temporary application of the brake quickly reduces the speed of the cam shaft, and leaves it under driving control of the slow speed clutch. The release of the treadle also causes a stop bar to engage and stop a brake disk carried on the cam shaft, and the continued rotation of the cam shaft applies the brake and stops the forward rotation of the shaft. As the cam shaft completes its forward rotation it throws into operation a one revolution clutch, the rotation of which first disengages a driving clutch on the end of the cam shaft, thus freeing the shaft from the slow speed driving mechanism, and then actuates a supplemental drive which in the machine shown is also a reversing mechanism to turn the cam shaft at low speed to stopping position.

The sewing machine shown is provided with a curved hook needle, the looper 2, the thread finger 3, a welt guide, the back gage 5, a feed point, and the channel guide 7, all of which are operated through suitable connections by cams carried by the cam shaft 8. As is usual in this type of machine, the cam shaft makes one revolution for each cycle of operations performed by the stitch forming and work feeding devices.

During the sewing the machine is driven through a belt pulley 9 carrying one member 10 of a driving clutch, the other member 11 of which is formed on a hand wheel 12 secured to the cam shaft 8. The pulley 9 is mounted to turn and slide freely on the hub of the hand wheel 12, and during the sewing is forced toward the hand wheel by a lever 13, the upper end of which carries a screw 14 engaging a bearing point 15 secured to the pulley. A felt lubricating sleeve 16 surrounds the screw and bearing point, as indicated in Fig. 4. The lever 13 is operated to engage and disengage the clutch members between the driving pulley 9 and hand wheel 12 by mechanism which will be described later.

The pulley 9 is connected by a driving belt 17 with a pulley 18 secured to a shaft 19 mounted in the base of the machine. The shaft 19 is connected through bevel gears 20 with a hollow driving shaft 21 which carries a driving clutch 22 (Figs. 1 and 14). The clutch 22 is mounted to slide on the shaft 21, and is connected to turn therewith by a pin 23 which passes through the hub of the clutch, through slots formed in the shaft, and through a clutch shifting rod 24 mounted within the shaft. The clutch 22 is provided with a main driving clutch member 25 arranged to engage a clutch member 26 formed on the high speed driving pulley 27. The clutch is also provided with a clutch member 28 adapted to engage a clutch member 29 formed on the low speed driving pulley 30. The clutch is forced in a direction to engage the members of the low speed clutch by a spring 31 acting on the rod 24, and is moved in a direction to engage the high speed clutch members by a wedge block 32 adapted to engage inclined surfaces formed on a sleeve 33. The sleeve 33 is mounted on a stationary bearing sleeve 34, and is arranged to engage thrust collars 35 interposed between the sleeve and a collar 36 secured to the rod 24. The wedge block 32 is connected by a link 37 with a lever 38 arranged to be engaged by a screw 39 carried by a treadle 40. The lever 38 is moved in a direction to raise the wedge block 32 by a spring 41, and the upward movement of the lever and block is limited by a stop screw 42. When the treadle is depressed, the clutch members 25 and 26 are engaged, and the machine is driven from a high speed main driving pulley 27, the speed of the machine being regulated by varying the pressure upon the treadle in the usual manner. When the treadle is released the main driving clutch is disengaged, and the clutch members 28 and 29 are engaged, so that the machine is driven from the slow speed pulley 30.

When the treadle is released to disengage the main driving clutch and throw in the slow speed driving clutch, a friction brake is momentarily applied to the hand wheel 12 to reduce the speed of the cam shaft through the following mechanism. The treadle 40 is connected by a link 43 with an arm 44 secured to a rock shaft 45. The rock shaft is moved in a direction to raise the treadle by a spring 46 connected to an arm 47 on the shaft. One end of the shaft carries an arm 48 which is connected to the lower end of a link 49, the upper end of which is connected to the lower end of a vertically sliding rod 50 (Figs. 1 and 2). The upper end of the link is provided with a rearwardly extending arm 51 pivotally connected to a brake cylinder 52. The cylinder surrounds and is free to slide on a piston 53 carried by the lower end of a piston rod 54 which passes through a stuffing box in the upper end of the cylinder and is pivotally connected at its upper end with a brake carrying arm 55 (Figs. 2 and 6). The brake carrying arm is pivoted at 56, and carries a brake shoe 57 arranged to engage the rim of the hand wheel 12. The cylinder 52 is provided with a port 58 near its lower end, a port 59 about midway of its length, and a port 60 at its upper end. The opening through the ports 58 and 59 may be adjusted by the screws 61 and 62, and the opening through the port 60 may be adjusted by the thumb screw 63. The piston is provided with ports 64, the lower ends of which are closed by a spring supported valve 65. The ports 58, 59 and 60 communicate with a passage 66 along the side of the cylinder, and the ports 58 and 59 are so adjusted that there is free communication between opposite sides of the piston when these ports are open, while the port 60 is so adjusted that it forms a restricted vent for the passage of the liquid from the cylinder. The cylinder is filled with oil or other suitable liquid. When the treadle is depressed the cylinder 52 is drawn down, so that the piston 53 is at the upper end of the cylinder. When the cylinder is in this position the piston 53 covers the port 59, and the only communication from one side of the piston to the other is through the restricted port 60. When the treadle is released the cylinder is raised and acts to force the brake against the hand wheel. The upward pressure of the cylinder causes the liquid below the piston to gradually flow through the port 60 to the upper end of the cylinder, so that the cylinder gradually rises. The upward movement of the cylinder finally carries the port 59 above the piston, so that there is free communication from one side of the piston to the other, with a resulting release of the pressure on the brake carrying arm. The piston and cylinder therefore act to apply the brake when the treadle is released, and the pressure on the brake is immediately relieved, so that it does not interfere with the movement of the cam shaft under the influence of the slow forward drive or reversing mechanism. When the cylinder is drawn down by the depression of the treadle, the liquid above the cylinder passes freely to the lower side of the piston through the ports 64, the valve 65 yielding to allow the passage of the liquid in this direction, but preventing the passage of the liquid in the opposite direction when the cylinder rises. The interval during which the brake is applied may be regulated by adjusting the thumb screw 63 which controls the opening through the port 60.

The release of the treadle also throws into operation the mechanisms for preliminarily stopping and then turning the cam shaft in a reverse direction to final stopping position. These mechanisms are controlled through devices operated by the upward movement of the rod 50 when the treadle is released. These devices comprise a cam shaft 67 carrying cams for controlling the stopping and reversing mechanisms, and operated through the rod 50 and connected treadle by a rack 68 formed on the rod and engaging a pinion 69 secured to the shaft. The upward movement of the rod 50 when the treadle is released rocks the cam shaft 67 to throw the stopping mechanism into operation, and then the upward movement of the rod and treadle is arrested by the engagement of the upper end of the rod with the under side of a slide 70 which at this time is in position over the end of the rod. As the cam shaft 8 completes its forward movement, the slide 70 is withdrawn, so that the rod 50 completes its upward movement and rocks the cam shaft 67 to throw the reversing mechanism into operation. Since the brake cylinder 52 is connected with the rod 50, the cylinder and piston not only act to apply the brake when the treadle is released, but also retard the upward movement of the rod 50 and the throwing into operation of the stopping mechanism until the brake has acted to slow down the cam shaft 8 of the machine to the speed of the slow speed driving mechanism. This insures the stopping of the forward motion of the cam shaft without undue shock or jar, and a uniform and reliable action of the stopping mechanism.

The stopping mechanism comprises a disk 71 loosely mounted on the hub of the hand wheel 12, and carrying the semi-circular brake shoes 72 which are arranged to engage the inner surface of a cylindrical flange 73 on the hand wheel. The brake shoes are pivotally connected to the disk by a pivot screw 74, and are provided at their free ends with devices for forcing them into engagement with the flange 73. These devices comprise a roll 75 mounted in the end of one of the shoes, and arranged to bear against a block 76 pivoted to the end of the other shoe and provided with a roll 77. The roll 77 is arranged to travel on the surface of a cam sleeve 78 which is secured to the hand wheel, and is provided with a cam surface 79 for coöperating with the roll 77 to spread the brake shoes and stop the rotation of the hand wheel and connected cam shaft. The brake disk 71 is connected with the sleeve 78 by a spring 80 which normally holds the disk in position with the head of the screw 74 against a stop shoulder 81 formed on a lug which projects from the sleeve 78. During the normal running of the machine the brake disk 71 rotates with the hand wheel and cam shaft in the direction of the arrows, Figs. 11 and 12. When the cam shaft 67 is rocked upon the release of the treadle, a stop bar 82 which has been held in retracted position by a cam 83 on the shaft 67 is released by the cam, so that it is forced upward by the spring pressed pin 84 which engages the lower end of the bar. The bar now rides along the periphery of the disk 71 until it is engaged by a stop shoulder 85 on the disk, when it rises into the notch, one side of which is formed by the shoulder 85, and arrests the rotation of the disk 71. The cam shaft 8 continues to rotate after the disk has been stopped, until the roll 77 on the brake shoe rides up the cam surface 79. The engagement of the cam 79 on the roll 77 first expands the brake shoes to overcome the inertia of the cam shaft, and then acts as a positive stop for arresting the forward movement of the cam shaft.

The upward movement of the stop bar 82 into the notch in the brake disk 71 not only arrests the movement of the disk to stop the cam shaft of the machine, but also brings the devices for withdrawing the slide 70 into position to be actuated by the final forward movement of said cam shaft. The devices for operating the slide 70 comprise a lever 86 pivotally connected to a vertically movable slide 87 by a pivot screw 88 which also connects the slide with the bar 82, as shown in Fig. 4. The lower end of the lever 86 engages a vertical slot formed in the slide 70, and the upper end of the lever carries a pivoted finger 89. The finger is provided with a slot 90, one end of which is normally held against a stop pin 91 by a spring 92. When the stop bar 82 rises into the notch in the brake disk, the finger 89 is moved up into the groove 93 formed in a sleeve 94 which is secured to the hub of the hand wheel 12. This brings the finger into the path of a shoulder 95 which projects across the groove and is so arranged that it engages the finger as the cam shaft 8 of the machine completes its forward movement. When the shoulder engages the finger, it rocks the lever 86 to withdraw the slide 70, and allow the rod 50 to complete its upward movement, and thus further rock the cam shaft 67. The finger 89 is free to swing idly about its pivot on the lever 86 when struck by the shoulder 95 during the reverse movement of the cam shaft. The mechanism which is thrown into operation by the final rocking movement of the cam shaft 67 to turn the cam shaft of the machine back to stopping position comprises a pawl carrying segment 96 mounted to turn about the cam shaft 8, and provided with a radially extending arm 97 carrying a pawl 98 which is arranged to engage a tooth 99 formed on a flange 100 of the sleeve 94 (Figs. 4 and 5). The pawl is drawn toward the flange 100 by a spring 101, and is normally held out of engagement with the flange by a stationary cam 102 which engages the tail of the pawl when the pawl carrying arm 97 is in its normal retracted position indicated in Fig. 5. The pawl carrying segment 96 is provided with gear teeth engaged by teeth formed on a segment 103 which is actuated through a crank pin 104 carried by a disk 105 and connected with the segment 103 by a link 106. The disk is normally stationary, and is given a single revolution to advance and retract the reversing pawl after the advance movement of the cam shaft has been arrested. The disk also carries a cam 107 which acts at the beginning of the rotation of the disk to disengage the driving pulley 9 from the hand wheel 12 so that the cam shaft is free to be moved back by the reversing pawl. The devices through which this is effected comprise a rock shaft 108 carrying an arm 109 arranged to be engaged and operated by the cam 107. The rock shaft 108 also carries a latch arm 110 which passes between the lower end of the clutch controlling lever 13 and a fixed surface 111 on the supporting frame work of the machine (Figs. 2, 3, 4 and 5). The lever 110 is provided with a projecting lug 112 adapted to engage the end of a screw 113 carried by the lever 13. When the treadle of the machine is depressed in starting the machine, the lever 13 is actuated to engage the clutch members between the driving pulley 9 and the hand wheel 12 by a cam 114 secured on the end of the cam shaft 67, and provided with cam surfaces adapted to engage segmental rolls 115 carried by the lever 13. The rolls are yieldingly held in normal position by the latch springs 116, and are so arranged that when the cam shaft 67 is rotated by the depression of the treadle the circular periphery of the rolls will ride against the swells on the cam 114 so that the cam will force the lower end of the lever 13 toward the left in Fig. 4 to engage the clutch members 10 and 11. When this occurs the latch arm 110 is raised by its spring 117 so that the lug 112 passes in front of the screw 113, thus latching the clutch members in engagement. When the cam shaft 67 is rocked in the opposite direction upon the release of the treadle, the segment 115 will yield to allow the swells on the cam 114 to pass freely by the rolls, so that the cam and rolls will not interfere with the free rocking of the shaft in this direction.

When the cam 107 on the disk 105 engages the arm 109, it rocks the shaft 108 and swings the latching arm 110 downward, thus releasing the lever 13 so that it is operated by a spring 118 to disengage the clutch members 10 and 11. After the clutch members have been thus disengaged, the continued rotation of the disk 105 advances the reversing pawl 98 so that it rides from under the cam 102 and engages the tooth 99 and turns the cam shaft back with a gradually accelerated and then gradually retarded motion into the position indicated in Fig. 5. When the reversing pawl starts forward, a cam 119 on the pawl carrying arm 97 rides from under a roll 120 carried on a pivot on a stop pawl 121, and allows the stop pawl to drop into engagement with the flange 122 of the sleeve 94. As the reversing pawl 98 completes its forward movement, the stop pawl 121 engages a shoulder 123 on the flange 122 and drops into a notch 124, thus accurately positioning the cam shaft 8 of the machine, and preventing any overthrow by the reversing pawl. As the pawl carrying segment completes its return movement into its normal position indicated in Fig. 5, the tail of the pawl rides under the cam 102, thus disengaging the pawl from the flange 94, and the cam 119 rides under the roll 120, thus disengaging the stop pawl 121 from the flange 122.

The mechanism for actuating the disk 105 is shown in Figs. 7 to 10. The disk is formed on the end of a hollow shaft or sleeve 125 which surrounds a shaft 126, and the disk is held within the casing 127 by a retaining plate 128 engaging an annular flange 129 on the outer periphery of the disk. A clutch member 130 is connected to rotate with the disk by pins 131 which permit the clutch member to move axially of the disk. The clutch member is provided on one end with clutch teeth adapted to engage corresponding clutch teeth formed on the opposing face of a continuously rotating gear 132. The clutch member is forced toward the gear by springs 133, and its movement toward and from the gear is controlled by a clutch controlling sleeve 134 which surrounds the clutch member and is interposed between the disk 105 and gear 132. The controlling sleeve is provided with inclined or spiral ribs 135 engaging corresponding grooves in the clutch member. When the controlling sleeve is free to rotate, the springs 133 will force the clutch member 130 into engagement with the gear 132, so that the clutch member, disk and controlling sleeve will rotate in unison. If the rotation of the controlling sleeve is arrested, however, the inclined ribs 135 will act to draw the clutch member 130 away from the gear 132, thus disengaging the clutch member from the gear and arresting the rotation of the clutch member and disk 105. The controller sleeve 134 is normally held against rotation by a controller slide 136 provided at its rear end with a projecting tooth 137 arranged to engage a stop shoulder 138 on the sleeve 134. The slide is forced toward the controller sleeve by a spring 139 interposed between a bushing 140 and the head of a sleeve 141 which is threaded on a screw 142 carried by a lug 143 which depends from the forward end of the slide (Fig. 10). The slide is withdrawn to throw the actuating clutch for the reversing mechanism into operation by the final rocking movement of the cam shaft 67, which takes place as above described as the main cam shaft 8 completes its forward movement. The devices for withdrawing the slide comprise a cam 144 projecting from a sleeve 145 which is mounted on the inner end of the cam shaft 67. The sleeve 145 is provided with lugs 146 adapted to be engaged by lugs 147 formed on a collar 148 which is secured to the shaft 67. The cam 144 is arranged to coöperate with a dog 149 pivoted to the outer end of the slide 136, and held yieldingly in normal position by a flat spring 150 which engages the flat end of the dog (Figs. 7 and 10). The movement of the dog on its pivot is limited by a pin 151 which projects from the side of the dog into a slot formed in the slide 136. When the cam shaft 67 is rocked by the depression of the treadle in starting the machine, the lugs 147 engage the lugs 146 and rock the cam sleeve 145 in a direction to carry the cam 144 down below the end of the dog 149, the dog yielding to allow the cam to pass, and then springing back into normal position so that its inner end lies above the cam 144. The lugs 146 and 147 are so formed that there is a certain amount of lost motion between them, and when the treadle is released in stopping the machine the first rocking movement imparted to the cam shaft 67, as above described, merely takes up this lost motion, so that the cam 144 remains below the end of the dog 149. When the final rocking movement is imparted to the shaft 67 at the end of the forward movement of the cam shaft 8 of the machine, the cam 144 rides up against the end of the dog 149, and after the pin 151 on the dog has engaged the upper end of the slot in the bar 136, the continued movement of the cam 144 forces the slide 136 toward the right in Fig. 10, withdrawing the tooth 137 from engagement with the shoulder on the controller sleeve 134, and thus throwing the clutch for operating the reversing mechanism into operation. The disk 105 is now driven through a single revolution as above described, and then the clutch is disengaged by the engagement of the shoulder 138 with the tooth 137. As the cam 144 passes the point of the dog 149, the spring 150 forces the dog downward slightly, so that the point of the dog is freed from the point of the cam, and the slide 136 is free to move inward into a position to engage the shoulder 138. In order to insure the disengagement of the end of the dog from the end of the cam, a cam 152 is formed on the controller sleeve 134, and is arranged to engage the inner end of the slide 136 and force the slide toward the right in Fig. 10 beyond the position to which it is forced by the cam 144. This frees the end of the dog from the cam, so that it may snap back into position to pass under the cam after the cam 152 has passed beyond the end of the slide 136. As the clutch member and disk 105 complete their revolution, and the clutch member is thrown out, a spring operated retaining pawl 153 drops into a notch 154 in the disk, and prevents backward rotation of the disk and clutch member.

The clutch gear 132 is continuously driven through a spiral pinion 155 secured to a vertical shaft 156, the upper end of which is connected through bevel gears 157 with a horizontal driving shaft 158. The rear end of the driving shaft 158 carries a driving pulley 159 loosely mounted on the shaft and connected therewith by a clutch 160. The clutch is held normally in engagement by a pivoted latch 161 (Fig. 2) which may be swung up to enable the clutch to be disengaged from the pulley by a rod 162. When the clutch is disengaged the shaft may be turned by hand by a hand wheel 163.

In case it is desired to stop the machine without actuating the reversing mechanism, a stop arm 164 (Figs. 1, 2 and 3), which is pivoted to the lower end of the slide 50, may be swung into position to engage the under side of the machine frame when the treadle is raised and prevent the upward movement of the slide and the throwing into operation of the reversing mechanism. The adjusting screw 165 in the stop arm may be so adjusted that the stop arm allows the treadle to move upward sufficiently to bring the driving clutch into mid-position between the high and low speed driving points, so that the machine is disconnected from the driving mechanism when the treadle is released. When the treadle is again depressed to start the machine, the stop arm 164 automatically swings into inactive position. The same result may be accomplished by a spring pressed latching pin 166 which is arranged to engage a notch in the rod 50 (Fig. 5).

By the mechanism above described the machine is automatically reversed to cast off the loop from the needle and bring the parts into position for the removal of the shoe. In stopping and reversing the machine the slowing down of the machine before the stopping devices are brought into action is insured, so that the forward rotation of the cam shaft is arrested while it is moving at a uniformly slow speed, and the cam shaft is turned back and brought to rest with a gradually retarded motion, so that a uniform stopping of the machine without undue shock or jar, and without wear upon the parts, is insured.

While it is preferred to employ the specific construction and arrangement of parts shown and described in embodying the invention in the machine of the application referred to, it will be understood that this construction and arrangement is not essential, and may be varied or modified as found desirable or best suited to the construction of machine in which the invention is to be embodied, without departing from the broader features of the invention.

Having explained the nature and object of the invention, and specifically described one form of machine in which it may be embodied, what is claimed is:—

1. A machine, having, in combination, main driving mechanism, a friction brake, mechanism for momentarily applying the brake when the main driving mechanism is thrown out, stopping devices controlled from the brake mechanism for arresting the forward motion of the machine at a predetermined point in the cycle of operations, and mechanism for turning the machine back to a predetermined position.

2. A machine, having, in combination, a cam shaft, main driving mechanism, mechanism for reducing the speed of the machine when the main driving mechanism is thrown out and stopping its forward motion, and mechanism for turning the cam shaft to a predetermined point with a gradually retarded motion.

3. A machine, having, in combination, a cam shaft, main driving mechanism, mechanism for stopping the forward motion of the cam shaft when the main driving mechanism is thrown out, a reversing pawl, a coöperating tooth connected with the cam shaft, and mechanism for reciprocating the pawl upon the arrest of the forward motion of the cam shaft.

4. A machine, having, in combination, a cam shaft, main driving mechanism, mechanism for stopping the forward motion of the cam shaft when the main driving mechanism is thrown out, a reversing pawl, a coöperating tooth connected with the cam shaft, and mechanism controlled by the stopping mechanism for reciprocating the pawl upon the arrest of the forward motion of the cam shaft.

5. A machine, having, in combination, a cam shaft, main driving mechanism, mechanism for stopping the forward motion of the cam shaft when the main driving mechanism is thrown out, a reversing pawl, a coöperating tooth connected with the cam shaft, a crank for reciprocating the pawl, and driving mechanism for the crank rendered active upon the arrest of the forward motion of the cam shaft.

6. A machine, having, in combination, a cam shaft, a driving clutch on the cam shaft, main driving mechanism, low speed driving mechanism thrown in when the main driving mechanism is thrown out, mechanism for stopping the forward motion of the cam shaft at a predetermined point in the cycle of operations of the machine, and mechanism for then disengaging the clutch and turning the cam shaft back to a predetermined position.

7. A machine, having, in combination, a cam shaft, a driving clutch on the cam shaft, main driving mechanism, low speed driving mechanism thrown in when the main driving mechanism is thrown out, mechanism for stopping the forward motion of the cam shaft at a predetermined point in the cycle of operations of the machine, and mechanism controlled by the stopping mechanism for then disengaging the clutch and turning the cam shaft back to a predetermined position.

8. A machine, having, in combination, a cam shaft, a driving clutch on the cam shaft, treadle controlled main driving mechanism, mechanism for stopping the forward motion of the cam shaft upon the release of the treadle, and mechanism for then disengaging the clutch and turning the cam shaft back to a predetermined position.

9. A machine, having, in combination, a cam shaft, a driving clutch on the cam shaft, treadle controlled main driving mechanisms, mechanism for stopping the forward motion of the cam shaft upon the release of the treadle, mechanism for then disengaging the clutch and turning the cam shaft back to a predetermined position, and means for reengaging the clutch when the treadle is depressed.

10. A machine, having, in combination, operating mechanism, driving mechanism therefor, mechanism under the control of the operator for slowing down and stopping the machine at a predetermined point in its cycle of operations, and means for retarding the throwing into operation of the stopping mechanism.

11. A machine, having, in combination, main driving mechanism, speed reducing and stopping mechanisms, means through which the operator may throw into operation the speed reducing and stopping mechanisms, and means for retarding the throwing in of the stopping mechanism.

12. A machine, having, in combination, main driving mechanism, low speed driving and stopping mechanisms, means under the control of the operator for shifting to the low speed drive and throwing in the stopping mechanism, and retarding means for controlling the throwing in of the stopping mechanism.

13. A machine, having, in combination, main driving mechanism, low speed driving and stopping mechanisms, means under the control of the operator for shifting to the low speed drive and throwing in the stopping mechanism, and means independent of the driven parts for delaying the throwing in of the stopping mechanisms after the low speed drive is thrown in.

14. A machine, having, in combination, driving mechanism, a slow speed driving mechanism, stopping devices, means under the control of the operator for rendering the speed reducing mechanism and stopping devices successively active, and retarding means for delaying the action of the stopping devices after the low speed drive has been rendered active.

15. A machine, having, in combination, operating mechanism, driving mechanism therefor, a friction brake, low speed forward driving mechanism, reverse driving mechanism, means for momentarily applying the brake and throwing in the low speed forward driving mechanism when the machine is to be stopped, means rendered active upon the release of the brake for arresting the forward motion of the machine, and means for disconnecting the low speed mechanism and rendering the reverse driving mechanism active.

16. A machine, having, in combination, operating mechanism, a shaft from which said mechanism is actuated, mechanism for driving the shaft during the operation of the machine, mechanism for reducing the speed of the machine and stopping its forward motion, and mechanism for turning the shaft to a predetermined point with a gradually retarded motion.

17. A machine, having, in combination, operating mechanism, a shaft from which said mechanism is actuated, driving mechanism therefor, mechanism for stopping the forward motion of the shaft when the driving mechanism is thrown out, a reversing pawl and coöperating tooth connected with the shaft, and mechanism for reciprocating the pawl upon the arrest of the forward motion of the shaft.

18. A machine, having, in combination, operating mechanism, a shaft from which said mechanism is actuated, mechanism for driving the shaft during the operation of the machine, speed reducing and stopping mechanism independent of the stopping mechanism, and mechanism rendered active upon the stopping of the forward motion of the shaft for driving it backward to a predetermined position.

19. A machine, having, in combination, operating mechanism, a shaft from which said mechanism is actuated, mechanism for driving the shaft during the operation of the machine, speed reducing and driving mechanism rendered active in stopping the machine for driving the shaft forward to a predetermined stopping position, and a normally inactive mechanism rendered active as the forward motion is completed for turning the shaft back to a predetermined point with an accelerated and then retarded motion.

20. A machine, having, in combination, operating mechanism, a shaft from which said mechanism is actuated, mechanism for driving the shaft during the operation of the machine, speed reducing and driving mechanism rendered active in stopping the machine for continuing the forward movement of the shaft to a stopping position, and mechanism for thereafter turning the shaft back to final stopping position with a gradually retarded motion.

21. A machine, having, in combination, a shaft, an operator controlled driving mechanism therefor, speed reducing and stopping mechanism for effecting a preliminary stopping of the shaft, and a supplemental drive independent of the preliminary stopping mechanism for subsequently turning the shaft at low speed to stopping position.

22. A machine, having, in combination, a shaft, driving mechanism therefor which may be thrown out at any point in the rotation of the shaft, speed reducing and stopping means for effecting a preliminary stopping of the shaft, and supplemental means independent of the preliminary stopping mechanism for subsequently driving the shaft at low speed to final stopping position.

23. A machine, having, in combination, a shaft, driving mechanism therefor which may be thrown out at any point in the rotation of the shaft, speed reducing and stopping means for effecting a preliminary stopping of the shaft, and normally inactive supplemental means for driving the shaft at low speed to final stopping position independent of and rendered active by the preliminary stopping means.

24. A machine, having, in combination, a variable speed driving clutch, stop mechanism, treadle operated parts movement of which operates the variable speed clutch and additional movement of which throws the stop mechanism into operation, and a stop which may be set by the operator to limit the movement of the treadle operated parts to that which operates the variable speed clutch.

ALBERT LATHAM.

Correction in Letters Patent No. 1,316,370.

It is hereby certified that in Letters Patent No. 1,316,370, granted September 16, 1919, upon the application of Albert Latham, of Beverly, Massachusetts, for an improvement in "Stop Mechanism," an error appears in the printed specification requiring correction as follows: Page 7, claim 18, strike out lines 87–88, and insert the words *mechanism, and mechanism independent of the stopping mechanism rendered active;* and that the said Letters Patent should be read with this correction therein that the same may conform to the record of the case in the Patent Office.

Signed and sealed this 21st day of October, A. D., 1919.

[SEAL.]

M. H. COULSTON,
*Acting Commissioner of Patents.*

Cl. 74—46.